US011919140B2

(12) United States Patent
Dales et al.

(10) Patent No.: US 11,919,140 B2
(45) **Date of Patent: *Mar. 5, 2024**

(54) SIDE HANDLE FOR POWER TOOL

(71) Applicant: MILWAUKEE ELECTRIC TOOL CORPORATION, Brookfield, WI (US)

(72) Inventors: Hugh A. Dales, Germantown, WI (US); Isabella A. Spek, Sussex, WI (US); Nicholas J. Losch, Hales Corners, WI (US); Mark A. Kubale, West Bend, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/158,918

(22) Filed: Jan. 24, 2023

(65) Prior Publication Data

US 2023/0158659 A1 May 25, 2023

Related U.S. Application Data

(63) Continuation of application No. 17/701,007, filed on Mar. 22, 2022, now Pat. No. 11,583,992.

(Continued)

(51) Int. Cl.
*B25F 5/02* (2006.01)
*B25F 5/00* (2006.01)

(52) U.S. Cl.
CPC . *B25F 5/02* (2013.01); *B25F 5/00* (2013.01)

(58) Field of Classification Search
CPC .... B25F 5/00; B25F 5/02; B25F 5/024; B25F 5/026; B25D 17/04; B26G 1/10; B26G 3/24

(Continued)

(56) References Cited

U.S. PATENT DOCUMENTS 2,706,423 A 4/1955 Rose
3,148,568 A 9/1964 Hoza
(Continued)

FOREIGN PATENT DOCUMENTS

CN 2832446 Y 11/2006
CN 203330994 U 12/2013
(Continued)

OTHER PUBLICATIONS

International Search Report and Written Opinion for Application No. PCT/US2022/021311 dated Jun. 28, 2022 (9 pages).

*Primary Examiner* — Roberta S Delisle
(74) *Attorney, Agent, or Firm* — Michael Best & Friedrich LLP

(57) ABSTRACT

A side handle assembly comprises a handle configured to be gripped by a user, a rod coaxially coupled the handle and rotationally fixed to the handle, and a clamp coupled to the rod. The clamp includes a flexible band enclosing an area and having a first end and a second end, a first connection block coupled to the first end of the flexible band, and a second connection block coupled to the second end of the flexible band. The rod includes an annular shoulder abutted with the first connection block and a threaded portion received within a threaded bore of the second connection block. In response to the handle being rotated in a first direction, the second connection block is moved closer to the first connection block along the threaded portion of the rod, decreasing the area enclosed by the flexible band.

20 Claims, 14 Drawing Sheets

Related U.S. Application Data

(60) Provisional application No. 63/165,902, filed on Mar. 25, 2021.

(58) Field of Classification Search
USPC .................................... 16/422, 426–427, 429
See application file for complete search history.

(56) References Cited

U.S. PATENT DOCUMENTS

| | | | | |
|---|---|---|---|---|
| 4,368,556 | A | 1/1983 | Wanner et al. | |
| 4,881,294 | A | 11/1989 | Riedl | |
| 5,926,913 | A | 7/1999 | Hernandez et al. | |
| 7,013,533 | B2 * | 3/2006 | Lumpkin | B62K 21/26 30/340 |
| 7,137,542 | B2 | 11/2006 | Oki et al. | |
| 7,252,156 | B2 | 8/2007 | Sugiyama et al. | |
| 7,451,524 | B2 | 11/2008 | Sattler | |
| 8,122,569 | B2 * | 2/2012 | Paul | B25F 5/026 16/436 |
| 8,166,614 | B2 | 5/2012 | Martin | |
| 8,186,018 | B2 | 5/2012 | Martin | |
| 8,234,756 | B2 | 8/2012 | Hahn et al. | |
| 8,407,860 | B2 * | 4/2013 | Brennenstuhl | B25F 5/026 16/422 |
| 8,621,719 | B2 * | 1/2014 | Nakashima | B25F 5/026 16/422 |
| 8,800,412 | B2 | 8/2014 | Griffin | |
| 8,914,947 | B2 | 12/2014 | Weiss | |
| 8,967,922 | B2 | 3/2015 | Yoshikane et al. | |
| 8,997,887 | B2 | 4/2015 | Furusawa et al. | |
| 9,021,662 | B1 | 5/2015 | Jones | |
| 9,022,702 | B2 | 5/2015 | Kasuya et al. | |
| 9,044,850 | B2 | 6/2015 | Kokinelis et al. | |
| 9,061,412 | B2 | 6/2015 | Hahn | |
| 9,180,586 | B2 | 11/2015 | Nemetz et al. | |
| 9,242,363 | B2 | 1/2016 | Moessnang et al. | |
| 9,308,638 | B2 | 4/2016 | Kondo et al. | |
| 9,370,860 | B2 | 6/2016 | Rieger et al. | |
| 9,498,876 | B2 | 11/2016 | Schubert | |
| 9,815,185 | B2 | 11/2017 | Machida | |
| 9,956,659 | B2 | 5/2018 | Takeuchi et al. | |
| 10,093,014 | B2 | 10/2018 | Geiger | |
| 10,179,400 | B2 | 1/2019 | Furusawa et al. | |
| 10,272,559 | B2 | 4/2019 | Friedrich et al. | |
| 10,406,670 | B2 | 9/2019 | Roehm et al. | |
| 10,537,984 | B2 | 1/2020 | Steingruber et al. | |
| 2009/0133889 | A1 | 5/2009 | Keller et al. | |
| 2010/0206595 | A1 | 8/2010 | Kamegai | |
| 2010/0282484 | A1 | 11/2010 | Moessnang et al. | |
| 2011/0120741 | A1 | 5/2011 | Limberg et al. | |
| 2012/0012353 | A1 | 1/2012 | Foerster et al. | |
| 2012/0160531 | A1 | 6/2012 | Martin et al. | |
| 2012/0160534 | A1 | 6/2012 | Von Saucken | |
| 2012/0312572 | A1 | 12/2012 | Nemetz et al. | |
| 2014/0020210 | A1 | 1/2014 | Brennenstuhl et al. | |
| 2014/0251649 | A1 | 9/2014 | Kondo | |
| 2014/0352114 | A1 | 12/2014 | Yoshikane et al. | |
| 2015/0174753 | A1 | 6/2015 | Kamiya | |
| 2015/0209952 | A1 | 7/2015 | Nishii et al. | |
| 2015/0306758 | A1 | 10/2015 | Chen et al. | |
| 2015/0328760 | A1 | 11/2015 | Ikuta et al. | |
| 2015/0328765 | A1 | 11/2015 | Schubert | |
| 2016/0114472 | A1 * | 4/2016 | Holubarsch | B25F 5/026 16/426 |
| 2016/0250744 | A1 | 9/2016 | Windsheimer | |
| 2017/0106517 | A1 | 4/2017 | Machida | |
| 2017/0252833 | A1 | 9/2017 | Bayona Salazar | |
| 2020/0180124 | A1 | 6/2020 | Ellice et al. | |
| 2021/0039240 | A1 | 2/2021 | Iida | |

FOREIGN PATENT DOCUMENTS

| | | | |
|---|---|---|---|
| CN | 203738753 | U | 7/2014 |
| CN | 204800580 | U | 11/2015 |
| CN | 104174896 | B | 1/2017 |
| CN | 105345753 | B | 12/2018 |
| CN | 208246737 | U | 12/2018 |
| CN | 209335560 | U | 9/2019 |
| DE | 3019914 | A1 | 1/1982 |
| DE | 8318425 | U1 | 10/1983 |
| DE | 8225299 | U1 | 2/1984 |
| DE | 3829801 | C2 | 1/1995 |
| DE | 4406718 | A1 | 8/1995 |
| DE | 102007039245 | A1 | 5/2008 |
| DE | 202008003462 | U1 | 5/2008 |
| DE | 102008040570 | A1 | 1/2010 |
| DE | 102010042551 | A1 | 4/2012 |
| DE | 102008028217 | B4 | 6/2015 |
| DE | 102012204457 | B4 | 11/2016 |
| DE | 102011010039 | B4 | 4/2019 |
| EP | 2159009 | A1 | 3/2010 |
| EP | 2045045 | B1 | 9/2010 |
| EP | 2191941 | B1 | 3/2012 |
| EP | 1400317 | B2 | 3/2014 |
| EP | 3127657 | A1 | 2/2017 |
| EP | 3213879 | A1 | 9/2017 |
| JP | 2001300868 | A | 10/2001 |
| WO | 2009089961 | A1 | 7/2009 |
| WO | 2009092486 | A1 | 7/2009 |
| WO | 2009101061 | A1 | 8/2009 |
| WO | 2010136245 | A1 | 12/2010 |
| WO | 2013000724 | A1 | 1/2013 |
| WO | 2019206720 | A1 | 10/2019 |
| WO | 2020260071 | A1 | 12/2020 |

* cited by examiner

SIDE HANDLE FOR POWER TOOL

CROSS-REFERENCE TO RELATED APPLICATIONS

This application is a continuation of U.S. patent application Ser. No. 17/701,007 filed on Mar. 22, 2022, now U.S. Pat. No. 11,583,992, which claims priority to U.S. Provisional Patent Application No. 63/165,902 filed on Mar. 25, 2021, the entire contents of each of which is incorporated herein by reference.

FIELD OF THE INVENTION

The present invention relates to power tools, and more particularly to side handle assemblies for use with power tools.

BACKGROUND OF THE INVENTION

Power tools, such as rotary power tools (e.g., drill drivers, hammer drills, rotary hammer, etc.) are typically used with side handle assemblies to provide the operator of the tool with an additional location where the power tool can be grasped to exert leverage while the power tool is being used. Such side handle assemblies are typically clamped to a neck on the power tool along a working axis of the power tool.

SUMMARY OF THE INVENTION

The present invention provides, in one aspect, a side handle assembly for a power tool. The side handle assembly comprises a handle configured to be gripped by a user, a rod coaxially coupled at a first end to the handle, the rod rotationally fixed to the handle, and a clamp coupled to the rod at a second end opposite the first end. The clamp includes a flexible band enclosing an area and having a first end and a second end, a first connection block coupled to the first end of the flexible band, the first connection block having a through bore, and a second connection block coupled to the second end of the flexible band, the second connection block having a threaded bore. The rod includes an annular shoulder abutted with the first connection block and a threaded portion received within the threaded bore of the second connection block. In response to the handle being rotated in a first direction, the second connection block is moved closer to the first connection block along the threaded portion of the rod, decreasing the area enclosed by the flexible band. In response to the handle being rotated in an opposite, second direction, the second connection block is moved away from the first connection block along the threaded portion of the rod, increasing the area enclosed by the flexible band.

The present invention provides, in another aspect, a side handle assembly for a power tool. The side handle assembly comprises a handle configured to be gripped by a user, a rod coaxially coupled at a first end to the handle, the rod and the handle sharing a common longitudinal axis, a mounting assembly including a first tool interface and a second tool interface, and an orientation adjustment mechanism coupling a second end of the rod to the mounting assembly. The first tool interface is moveable relative to the second tool interface to selectively apply a clamping force to the power tool to secure the side handle assembly to the power tool. The orientation adjustment mechanism is configured to selectively affix an orientation of the rod and the handle relative to the mounting assembly.

Other features and aspects of the invention will become apparent by consideration of the following detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
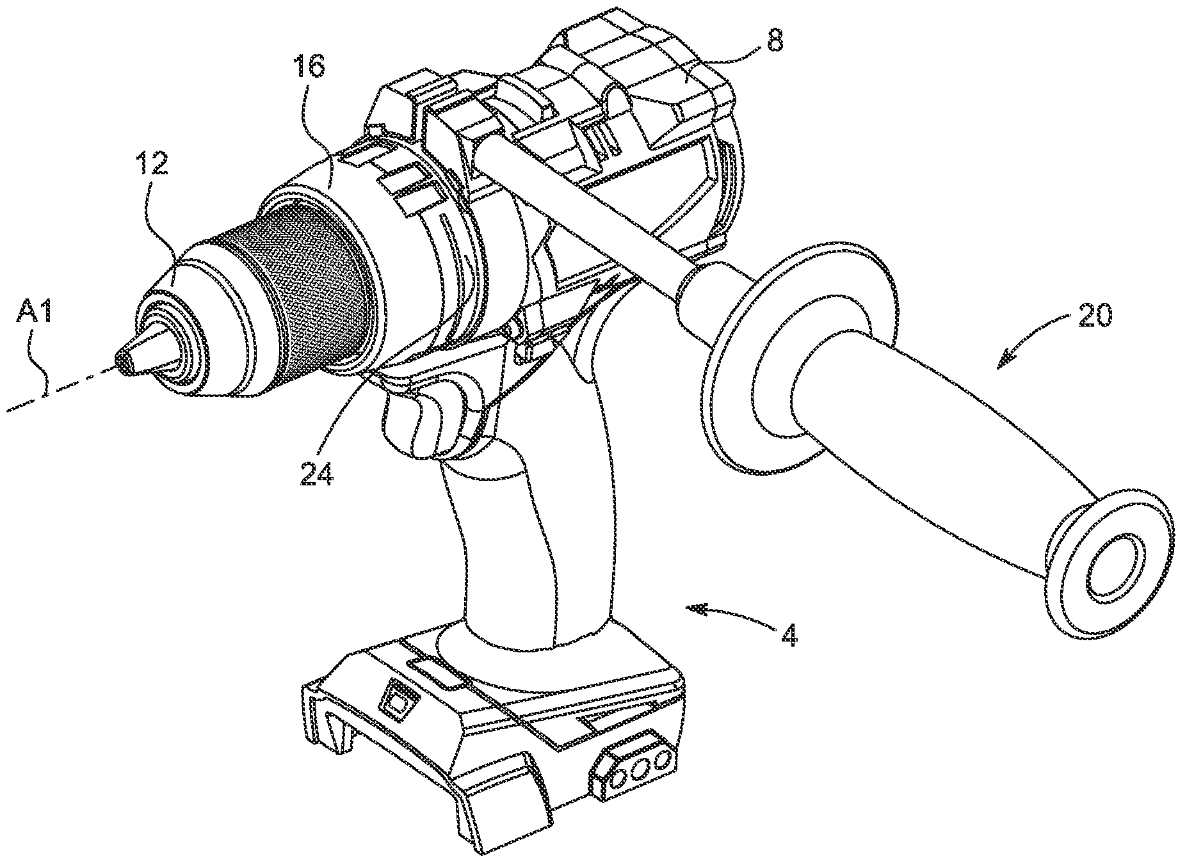
FIG. 1 is perspective view of a hammer drill including a side handle assembly in accordance with an embodiment of the invention.

FIG. 1 illustrates a rotary power tool, such as a hammer drill 4. The hammer drill 4 includes a housing 8, a chuck 12, and a clutch ring 16. A tool bit (not shown) may be secured to the chuck 12 for co-rotation with the chuck 12 about a rotational axis A1. In the illustrated embodiment, the hammer drill 4 includes a side handle assembly 20 to provide the operator of the hammer drill 4 with an additional location (besides a rear handle) where the hammer drill 4 can be grasped to exert leverage while the hammer drill 4 is being used. The side handle assembly 20 is mounted to a neck 24 of the hammer drill 4 coaxial with the rotational axis A1, permitting the operator to grasp the hammer drill 4 with two hands at two distinct locations (at the rear handle and the side handle assembly 20, proximate the front of the hammer drill 4).

Figure 2:
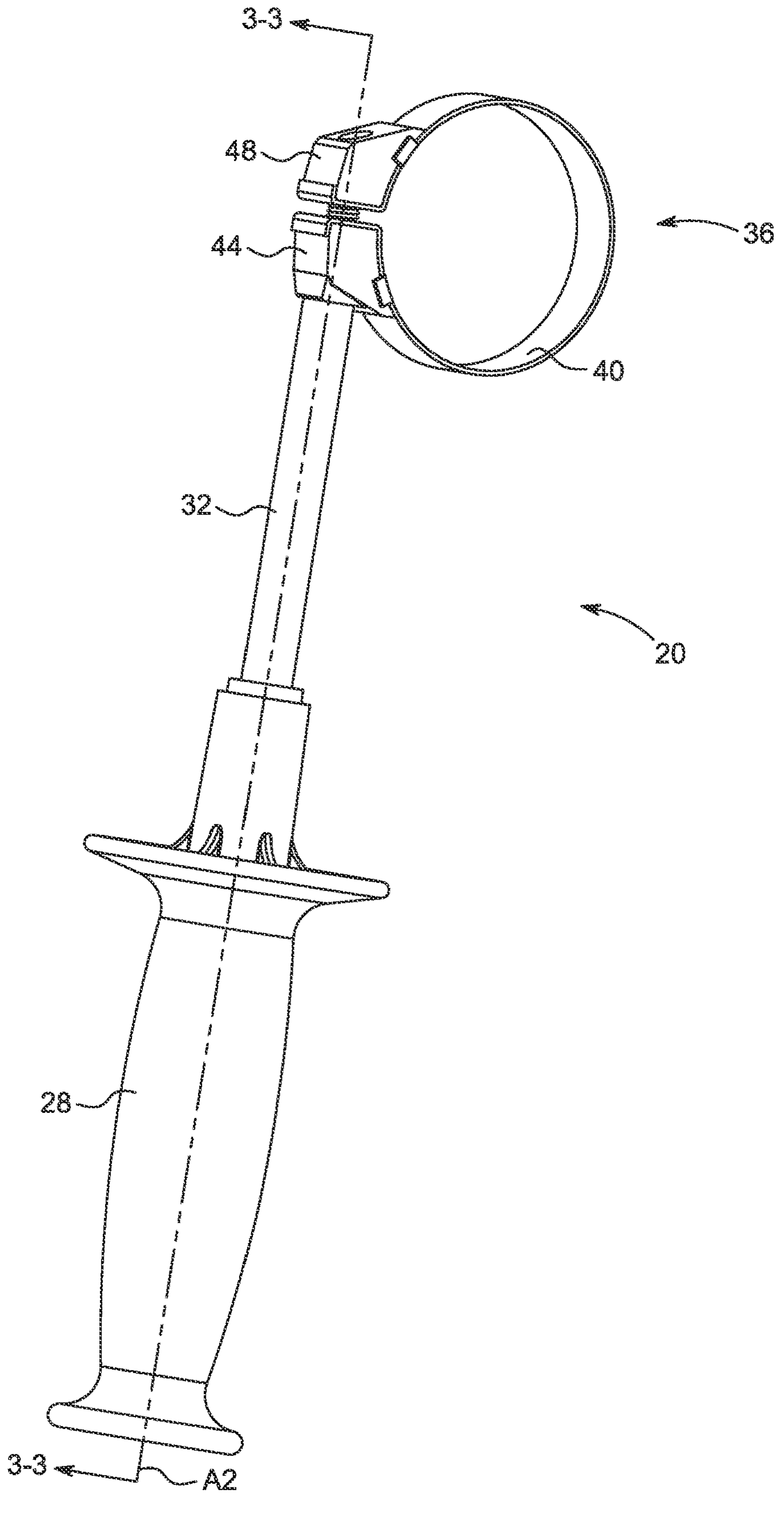
FIG. 2 is a perspective view of the side handle assembly of FIG. 1

FIG. 2 illustrates the side handle assembly 20 of FIG. 1. The side handle assembly 20 includes a handle 28 that is configured to be gripped by a user. A rod 32 is fixedly attached to the handle 28 so that rotation of the handle 28 results in a similar rotation of the rod 32 about a common longitudinal axis A2. In other words, the rod 32 is fixed to the handle 28 for rotation therewith. In the illustrated embodiment, a band clamp 36 is attached to the rod 32 opposite the handle 28. The band clamp 36 includes a flexible band 40 having a first connection block 44 at a first end and a second connection block 48 at a second end. The first and second connection blocks 44, 48 are attached to the rod 32 in such a way that the flexible band 40 encloses a substantially circular area. As seen in FIG. 1, the band clamp 36 surrounds the neck 24 of the hammer drill 4 to attach the side handle assembly 20 to the hammer drill 4.

Figure 3:
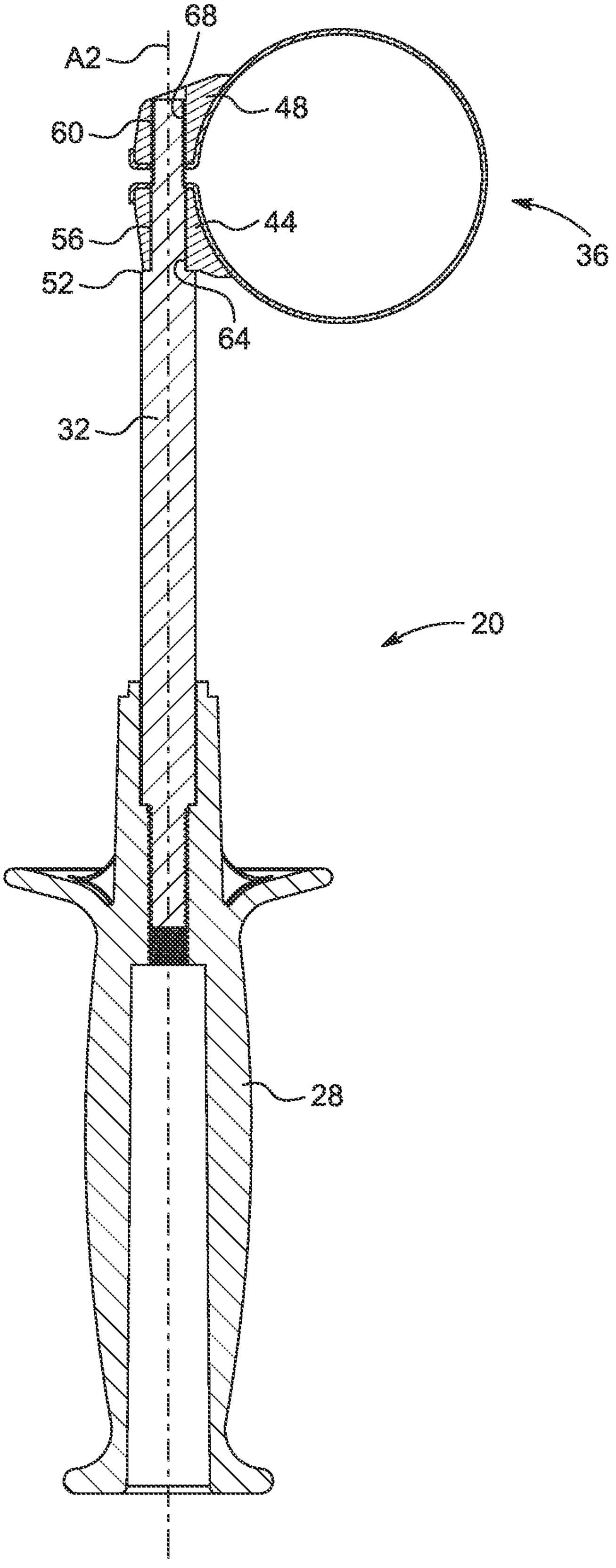
FIG. 3 is a cross-sectional view of the side handle assembly of FIG. 2 taken along section line 3-3.
Figure 4:
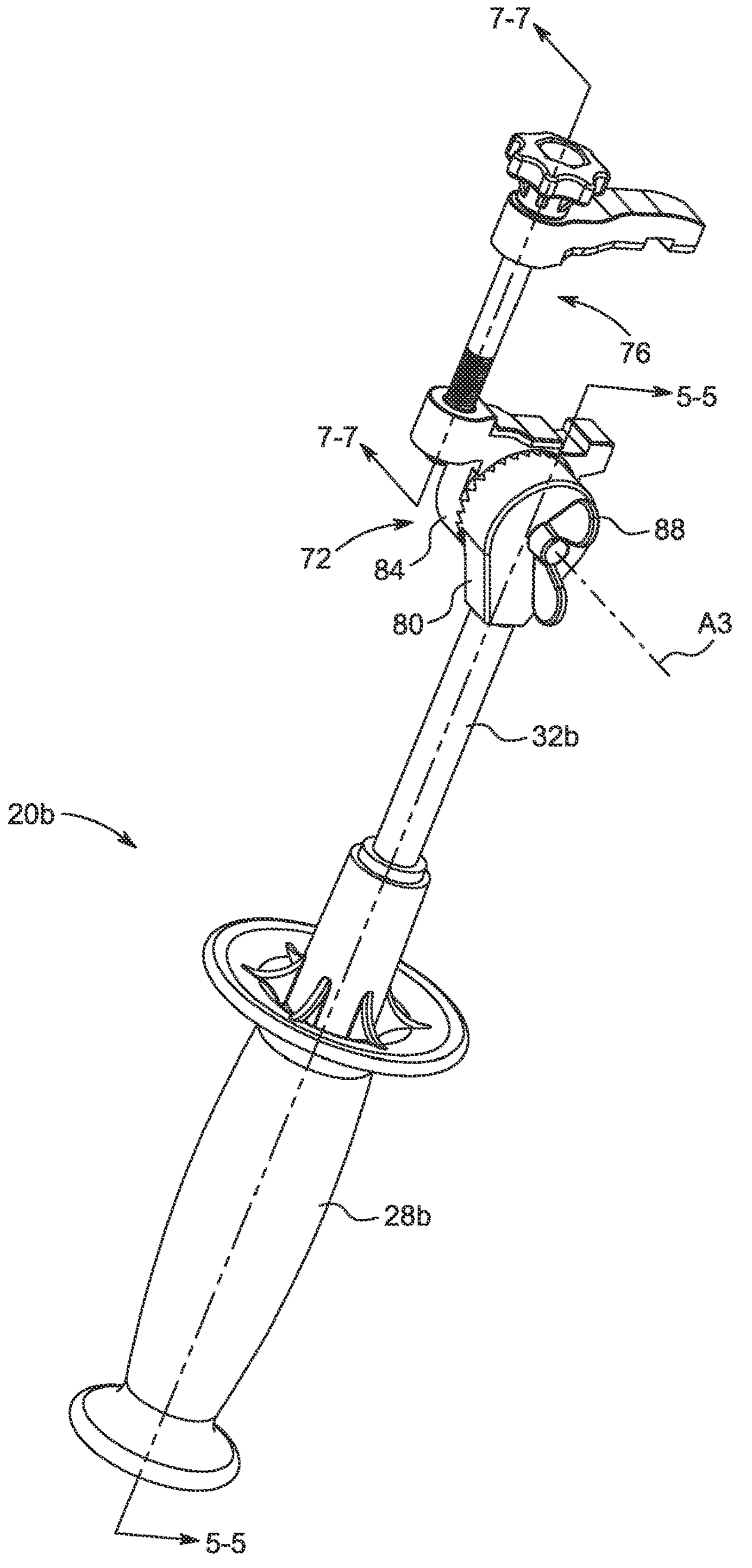
FIG. 4 is a perspective view of a side handle assembly in accordance with another embodiment of the invention.

With reference to FIG. 3, a second end of the rod 32, where the rod 32 is attached to the band clamp 36, includes an annular shoulder 52, a non-threaded portion 56, and a threaded portion 60. Within the first connection block 44 is a through bore 64 sized to receive the non-threaded portion 56 of the second end of the rod 32. Within the second connection block 48 is a threaded bore 68 that corresponds to the threaded portion 60 of the second end of the rod 32. The first connection block 44 receives the non-threaded portion 56 and is abutted against the annular shoulder 52 such that the first connection block 44 is prohibited from moving along the longitudinal axis A2 toward the handle 28. The second connection block 48 is attached to the rod 32 at the threaded portion 60. Rotation of the handle 28, and thus the rod 32, about the longitudinal axis A2 results in the second connection block 48 moving along the threaded portion 60 of the rod 32. If the handle 28 is rotated in a first direction (e.g., clockwise), the interaction of the threads on the rod 60 and the threads within the second connection block 68 result in the second connection block 48 moving toward to the first connection block 44 and the annular shoulder 52, thereby decreasing the substantially circular area enclosed by the band clamp 36. If the handle 28 is rotated in a second direction opposite the first direction (e.g., counterclockwise), the second connection block 48 moves away from the first connection block 44, increasing the substantially circular area enclosed by the band clamp 36. Decreasing the area of the band clamp 36 while it surrounds the neck 24 of the hammer drill 4 results in the band clamp 36 exerting a clamping force on the neck 24 and securing the side handle assembly 20 to the hammer drill 4. Increasing the area enclosed by the band clamp 36 removes the clamping force from the hammer drill 4 and allows the side handle assembly 20 to be removed from the hammer drill 4.

Figure 5:
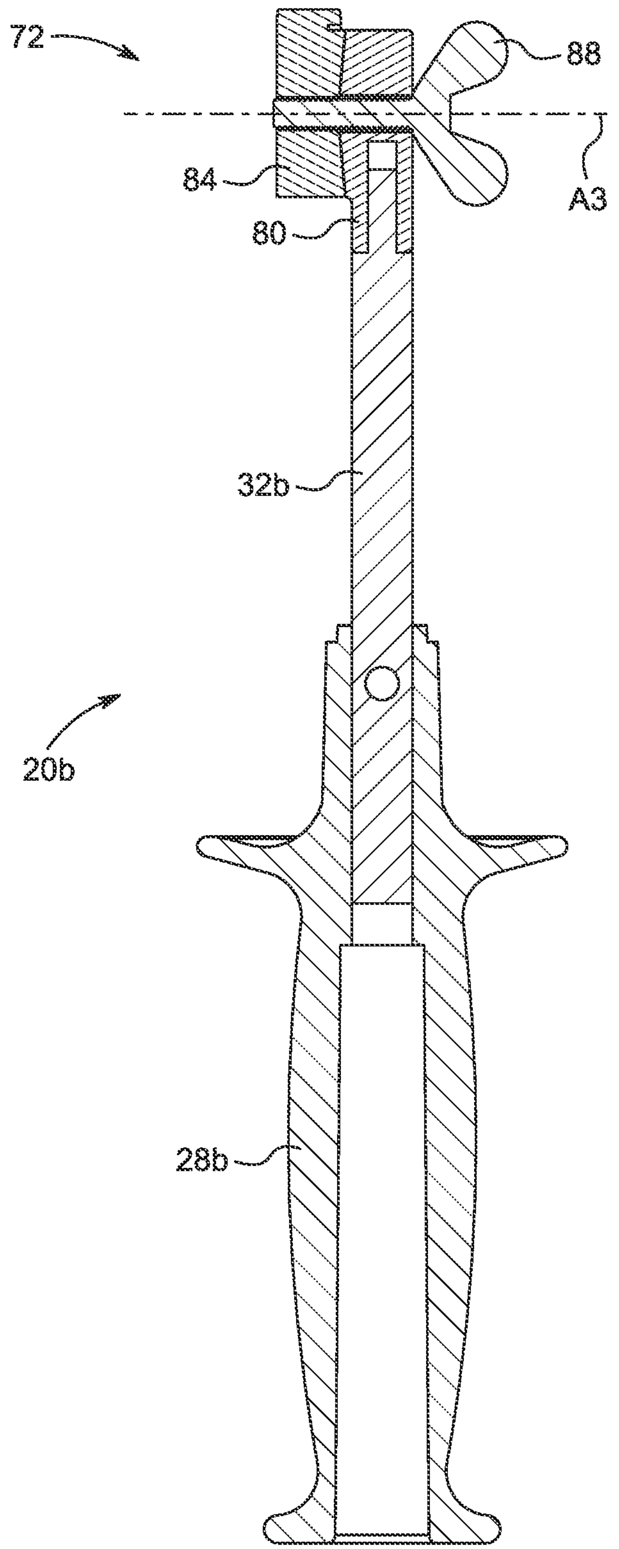
FIG. 5 is a cross-sectional view of the side handle assembly of FIG. 4 taken along section line 5-5.

FIGS. 4-7 illustrate a side handle assembly 20*b* according to another embodiment of the invention. The side handle assembly 20*b* is similar to the side handle of the previous embodiment, with like parts having the same reference numeral plus the letter "b", and the following differences explained below. Rather than a band clamp attached to the second end of the rod 32*b*, the side handle assembly 20*b* includes an orientation adjustment mechanism 72 and a mounting assembly 76. The illustrated embodiment allows for the orientation of the side handle assembly 20*b* with respect to the hammer drill 4*b* to be adjusted without removing the mounting assembly 76 from the hammer drill 4. In the illustrated embodiment, the orientation adjustment mechanism 72 includes a mated pair of face gears 84, each having radially extending teeth arranged about a rotational axis A3 of the respective face gear 80, 84. A first face gear 80 is affixed to the second end of the rod 32*b* and a second face gear 84 is affixed to the mounting assembly 76. With reference to FIG. 5, a fastener 88, such as a bolt and wing nut, secures the first face gear 80 to the second face gear 84. When the fastener 88 is tightened, the first face gear 80 mates with the second face gear 84, thereby preventing relative rotation between the first face gear 80 and the second face gear 84. In other words, tightening the fastener 88 fixes the orientation of the handle 28*b* and rod 32*b* with respect to the mounting assembly 76 by fixing the orientation of the first and second face gears 80, 84. When the fastener 88 is loosened, the first face gear 80 can disengage the second face gear 84, thereby allowing relative rotation between the first face gear 80 and the second face gear 84. The relative rotation allows for the orientation of the side handle assembly 20*b* to be adjusted with respect to the hammer drill 4*b* without removing the mounting assembly 76 from the hammer drill 4*b*.

Figure 6:
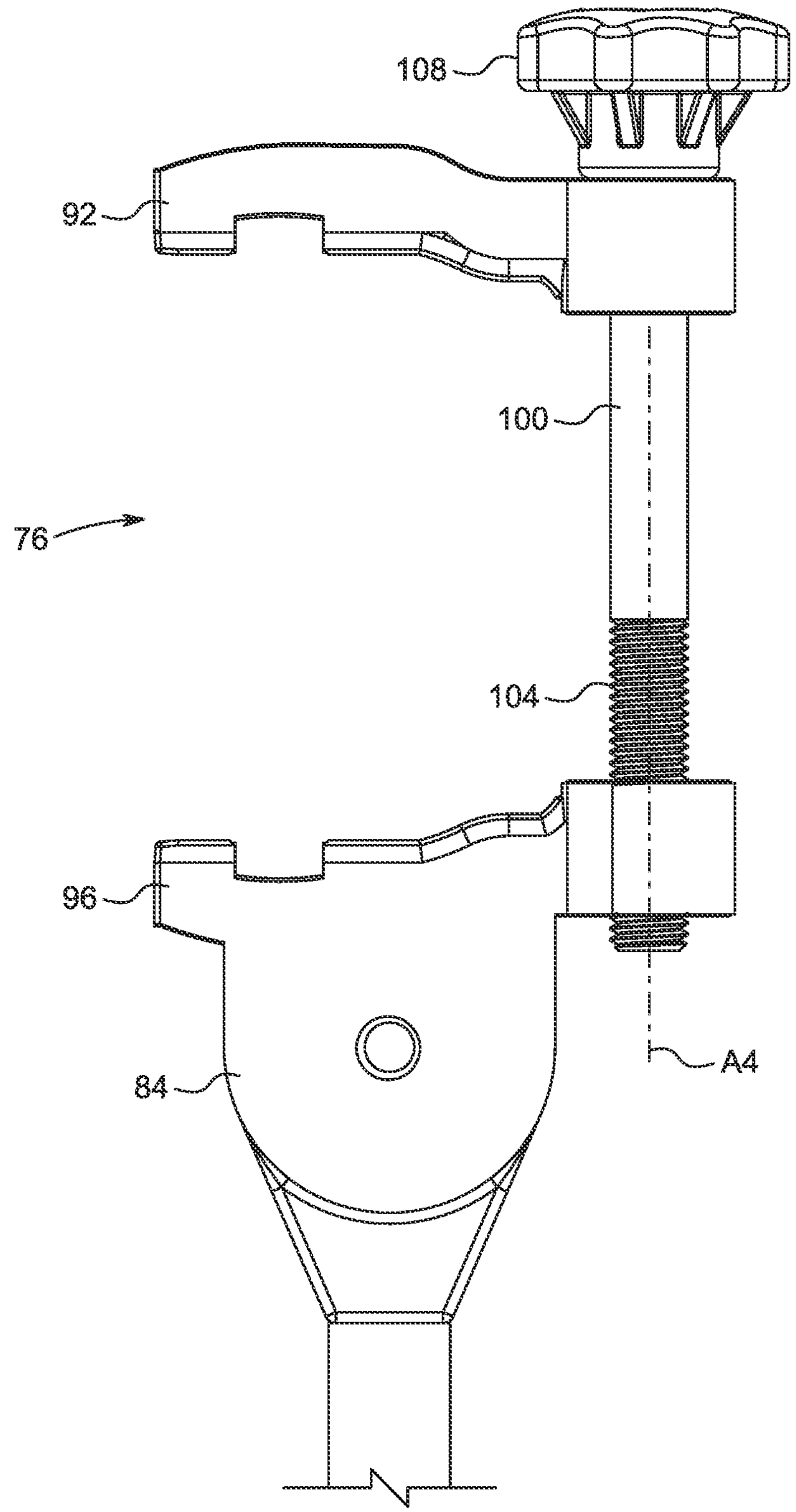
FIG. 6 is an enlarged side view of a mounting assembly of the side handle assembly of FIG. 4.
Figure 7:
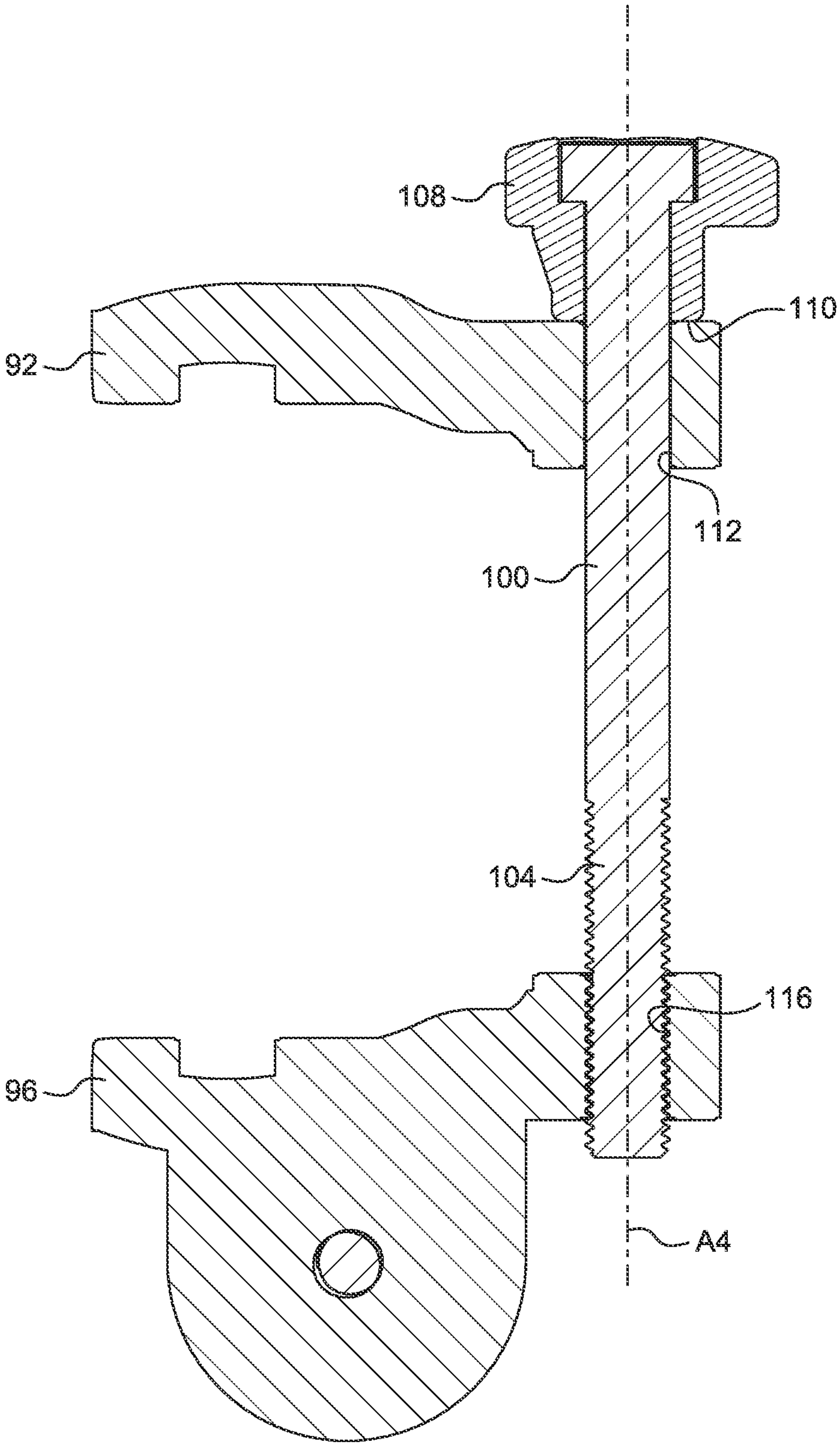
FIG. 7 is a cross-sectional view of the mounting assembly of FIG. 4 taken along section line 7-7.

With reference to FIGS. 6-7, the mounting assembly 76 includes a first tool interface 92, a second tool interface 96, and a clamping shaft 100. In the illustrated embodiment, the clamping shaft 100 is illustrated as a partially threaded rod. The clamping shaft 100 includes a threaded portion 104 at one end and a knob 108 at an opposite end that defines a shoulder 110 against which the first tool interface 92 is abutted. The first tool interface 92 of the illustrated embodiment is shaped to correspond with a portion of the neck 24*b* of the hammer drill 4*b* and includes a through bore 112 located such that, when the clamping shaft 100 is inserted in the through bore 112, the clamping shaft 100 does not interfere with the tool housing 8*b*. The first tool interface 92 is abutted with the shoulder 110 of the knob 108 to limit the extent to which the first tool interface 92 can move along a longitudinal axis A4 of the clamping shaft 100 away from the second tool interface 96. In the illustrated embodiment, the second tool interface 96 is integrally formed with the second face gear 84. In other embodiments, the second tool interface 96 can be separately formed from the second face gear 84 and then affixed to the second face gear 84. The second tool interface 96 is shaped such that a portion of the second tool interface 96 corresponds to a portion of the neck 24*b* of the hammer drill 4*b*, thereby allowing the second tool interface 96 to grip the hammer drill 4*b* when installed. A threaded bore 116 exists within the second tool interface 96 and is sized to receive the threaded portion 104 of the clamping shaft 100 in such a way that the clamping shaft 100 does not interfere with the tool housing 8*b*. As the knob 108 of the clamping shaft 100 is rotated in a first direction (e.g., clockwise), the first tool interface 92, which is abutted against the shoulder 110 of the knob 108, is moved toward the second tool interface 96 due to the interaction of the threaded portion 104 of the clamping shaft 100 and the threaded bore 116 within the second tool interface 96. The resulting decreased distance between the first and second tool interfaces 92, 96 allows the first and second tool interfaces 92, 96 to engage the neck 24*b* of the hammer drill 4*b* and apply a clamping force thereto. Rotation of the knob 108 in a second direction (e.g., counterclockwise), opposite the first, separates the first and second tool interfaces 92, 96 and disengages the side handle assembly 20*b* from the neck 24*b* of the hammer drill 4*b*.

Figure 8:
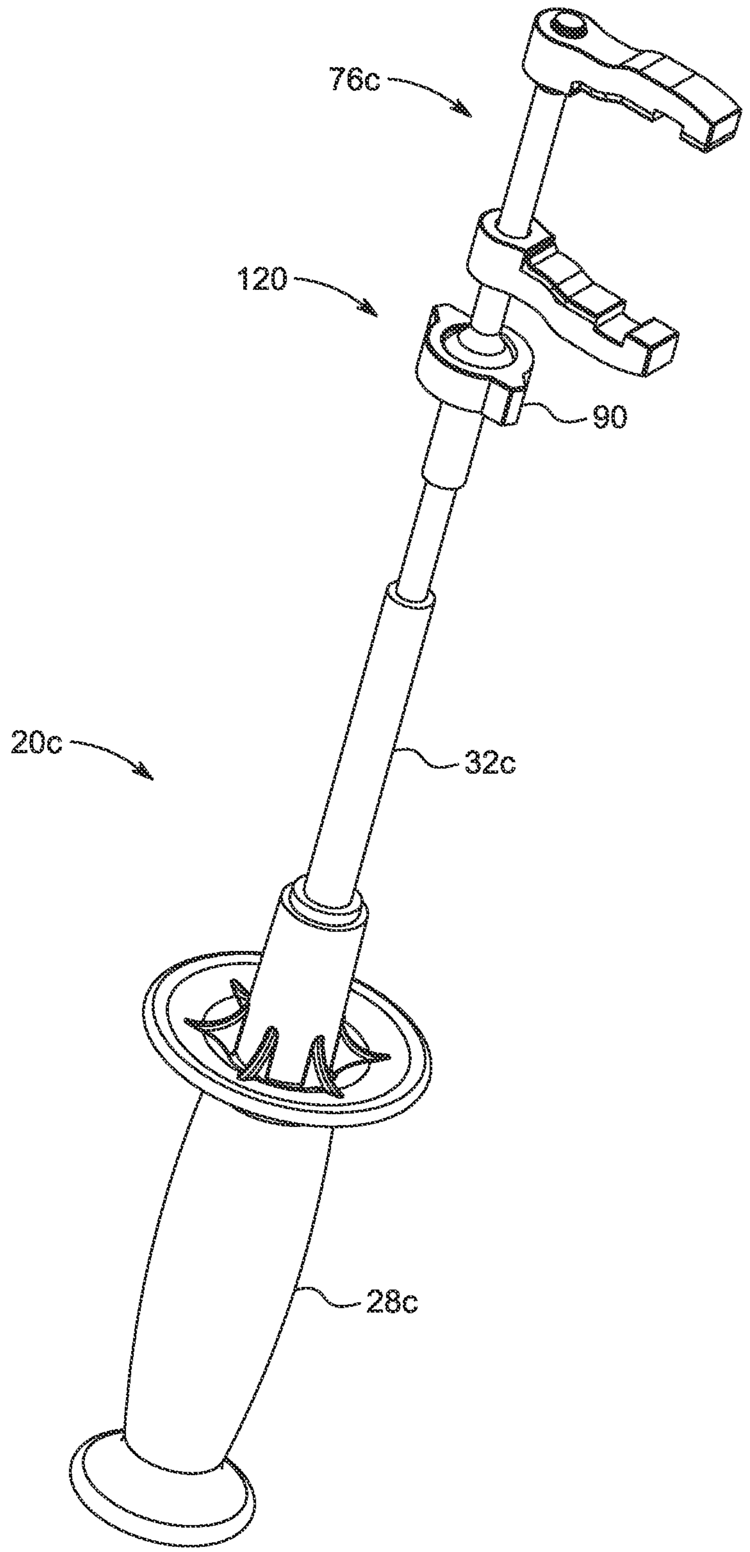
FIG. 8 is a perspective view of a side handle assembly in accordance with another embodiment of the invention.
Figure 9:
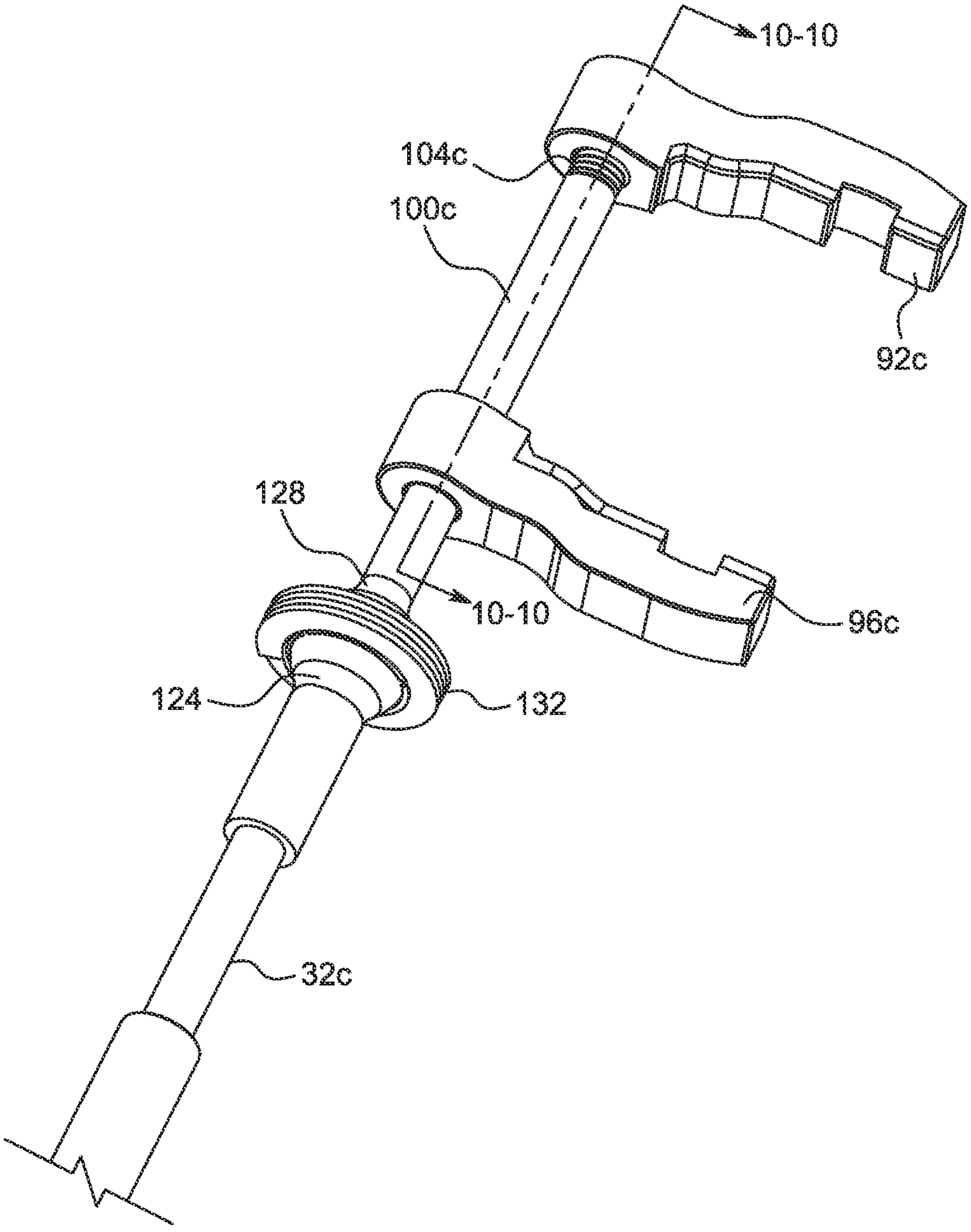
FIG. 9 is an enlarged perspective view of the side handle assembly of FIG. 8 showing an orientation adjustment mechanism and a mounting mechanism.
Figure 10:
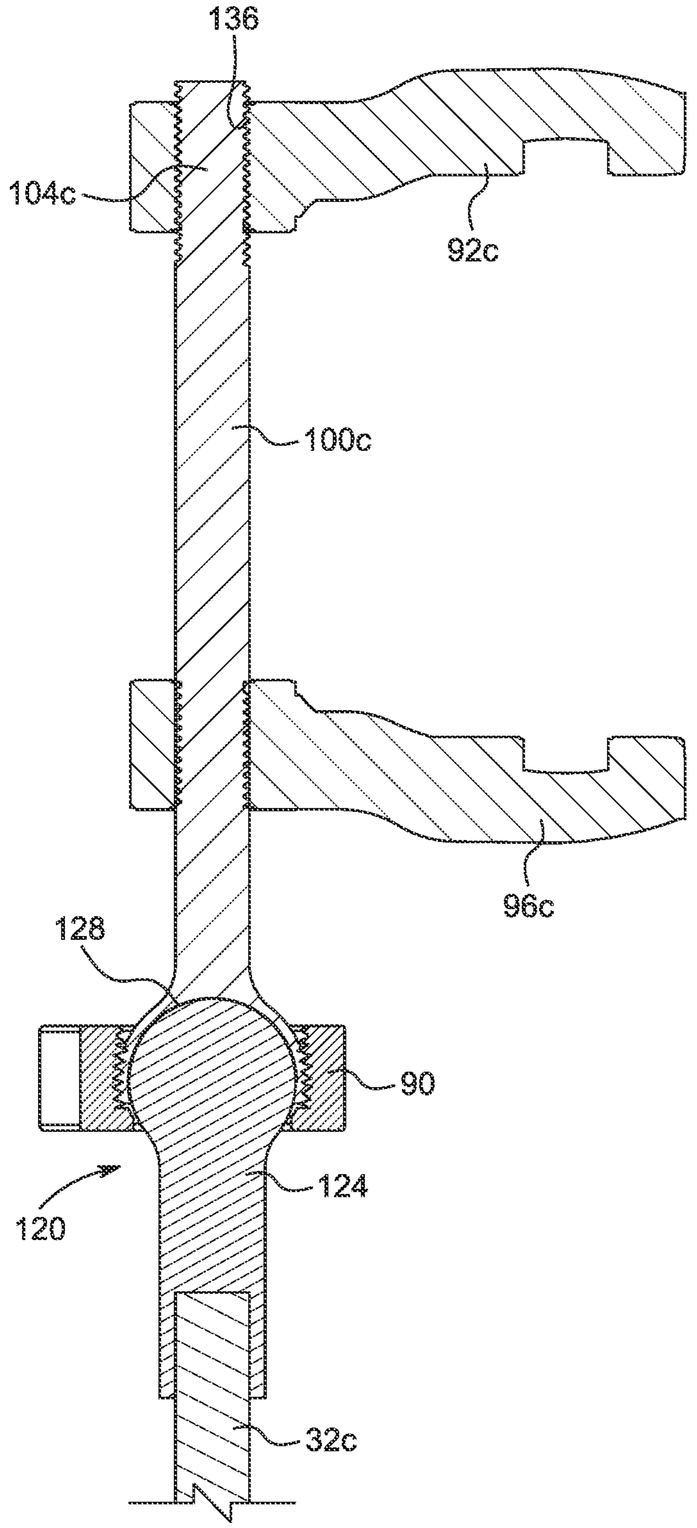
FIG. 10 is a cross-sectional view of the side handle assembly of FIG. 9 taken along section line 10-10.
Figure 11:
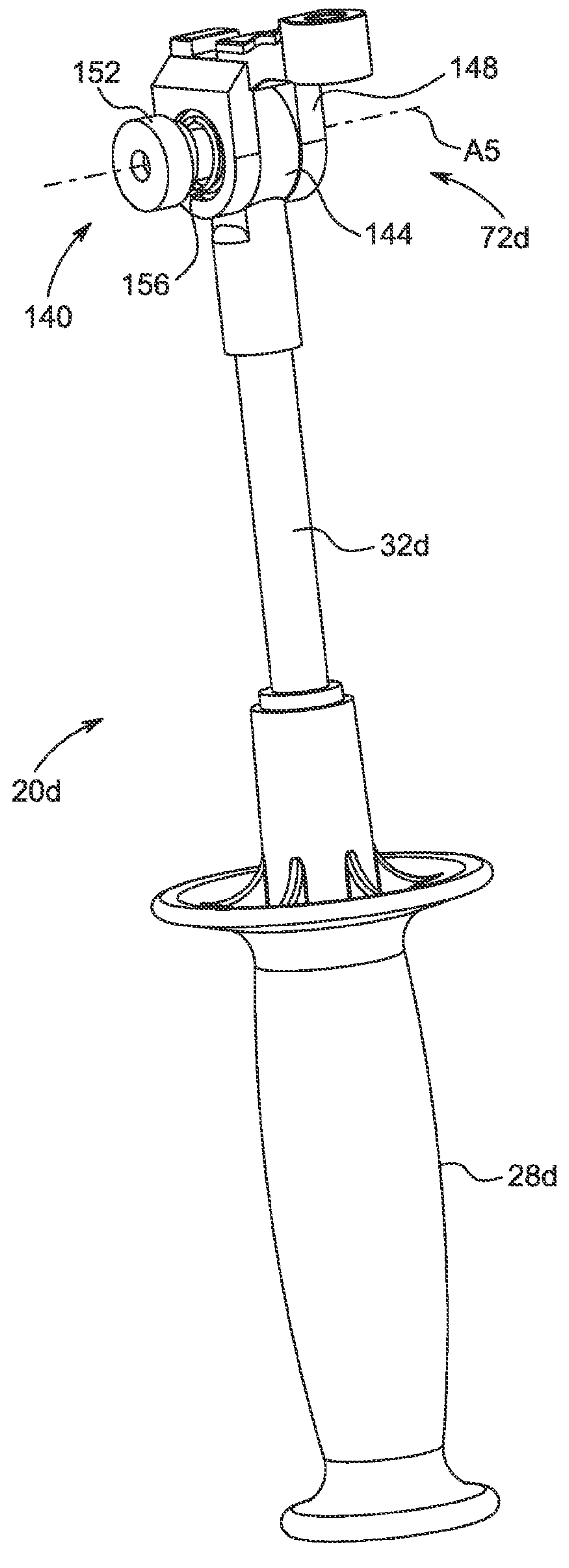
FIG. 11 is a perspective view of a side handle assembly in accordance with another embodiment of the invention.

FIGS. 8-10 illustrate a side handle assembly 20*c* according to another embodiment of the invention. The side handle assembly 20*c* is similar to the side handle of the previous embodiments, with like parts having the same reference numeral plus the letter "c", and the following differences explained below. Rather than utilizing face gears to adjust the orientation of the handle 28*c* with respect to the hammer drill 4*c*, the illustrated embodiment includes a ball and socket joint 120. A ball 124 is affixed to the second end of the rod 32*c*. A socket 128 of corresponding size is affixed to a first end of the clamping shaft 100*c* of the mounting assembly 76*c*. On the outside of the socket 128 are threads 132 intended to interface with a fastener (e.g., a nut 90 that surrounds the ball and socket joint 120. When the nut 90 is removed from the socket 128, the ball 124 and rod 32*c* are capable of swiveling relative to the socket 128 and mounting assembly 76*c*. When the nut 90 is threaded onto the socket 128, the socket 128 is tightened around the ball 124, thereby preventing relative motion between the ball 124 and the socket 128. In other embodiments, the ball 124 may be coupled to the mounting assembly 76*c* and the socket 128 may be coupled to the rod 32*c*. The ball 124 and the socket 128 may be integrally formed with the rod 32*c* or clamping shaft 100*c*, respectively, or they may be separately formed and subsequently affixed.

With continued reference to FIG. 10, the mounting assembly 76*c* includes the clamping shaft 100*c* affixed to the socket 128, a first tool interface 92*c*, and a second tool interface 96*c*. In the illustrated embodiment, the socket 128 is integrally formed at one end of the clamping shaft 100*c*. At an end of the clamping shaft 100*c* opposite the socket 128 is a threaded portion 104*c*. The threaded portion 104*c* is mated with a threaded bore 136 within the first tool interface 92*c*. The second tool interface 96*c* is axially affixed to the clamping shaft 100*c* proximate to the socket 128, yet the clamping shaft 100*c* is permitted to rotate relative to the second tool interface 96*c*. In operation, with the ball and socket joint 120 in a locked state, rotating the handle 28*c* in a first direction (e.g., clockwise) also rotates the clamping shaft 100*c* relative to the first tool interface 92*c*, moving the first tool interface 92*c* closer toward the second tool interface 96*c* and decreasing the distance between the first and second tool interfaces 92*c*, 96*c* to allow them to exert a clamping force on the neck 24*c* of the hammer drill 4*c*. Rotating the handle 28*c* and clamping shaft 100*c* in an opposite direction (e.g., counterclockwise) separates the first and second tool interfaces 92*c*, 96*c*, thereby allowing for the removal of the side handle assembly 20*c* from the neck 24*c* of the hammer drill 4*c*.

Figure 12:
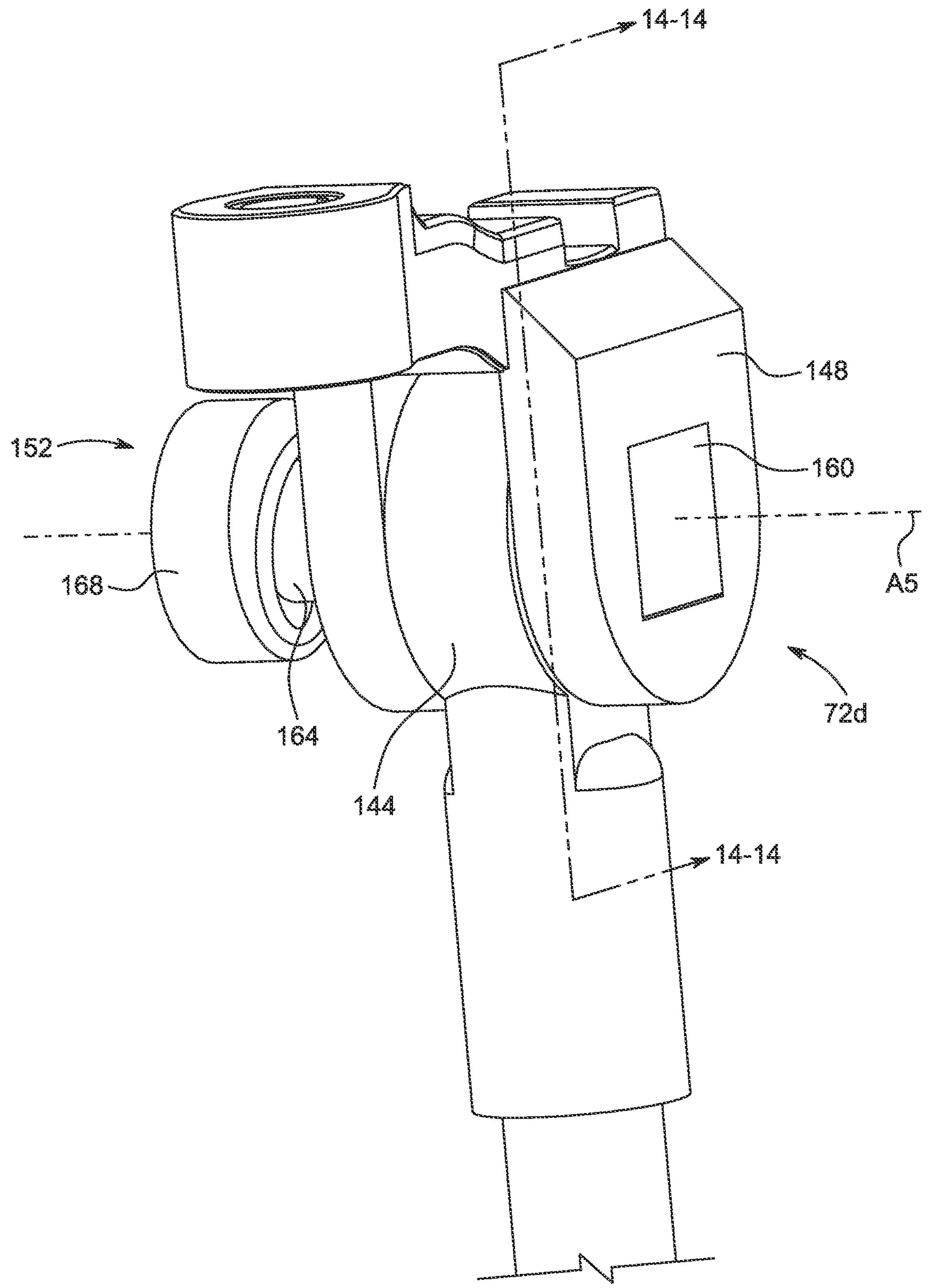
FIG. 12 is an enlarged perspective view of the side handle assembly of FIG. 11 showing an orientation adjustment mechanism.
Figure 13:
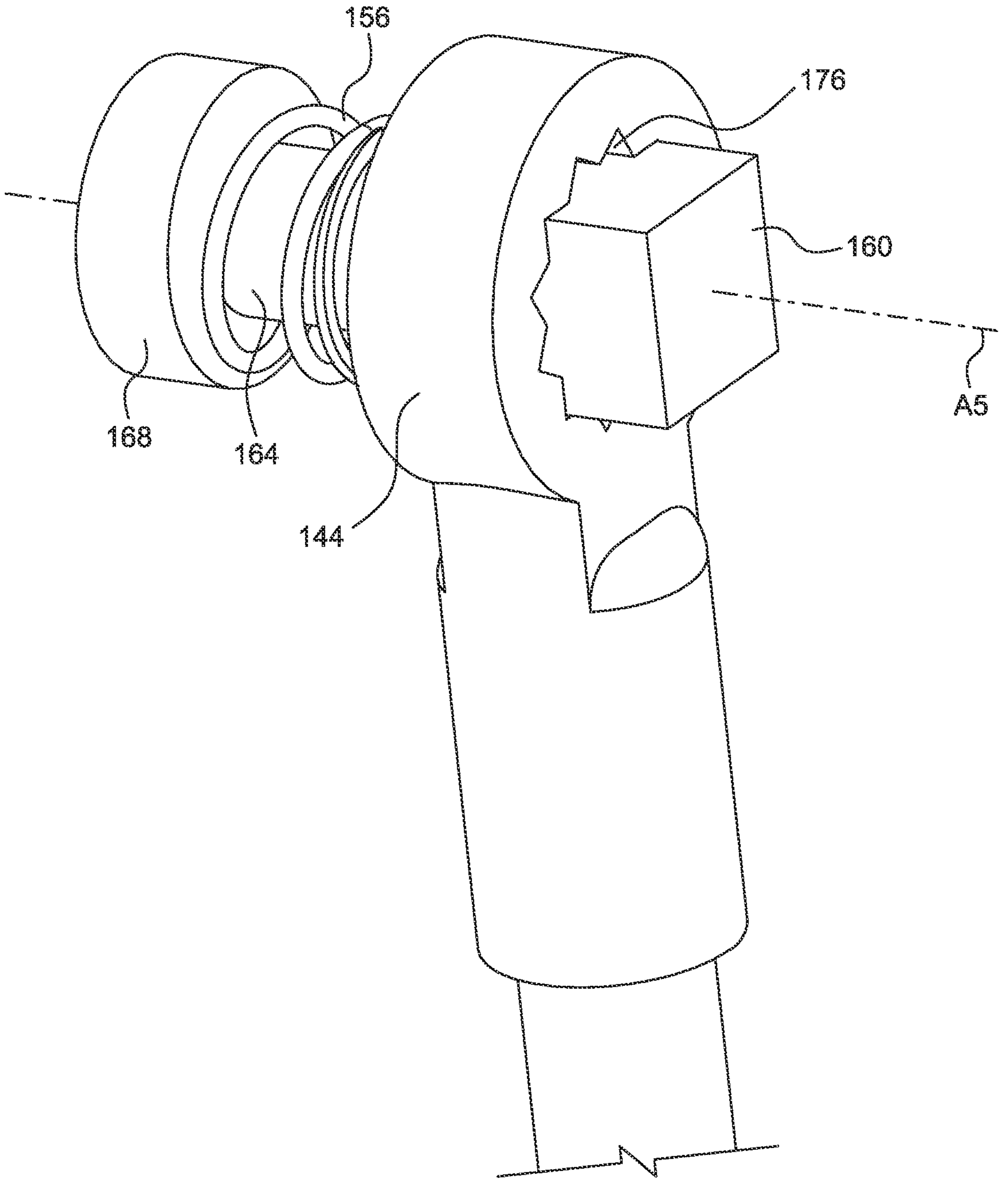
FIG. 13 is an enlarged perspective view of the side handle assembly of FIG. 11 showing an orientation adjustment mechanism with a second receiver removed.
Figure 14:
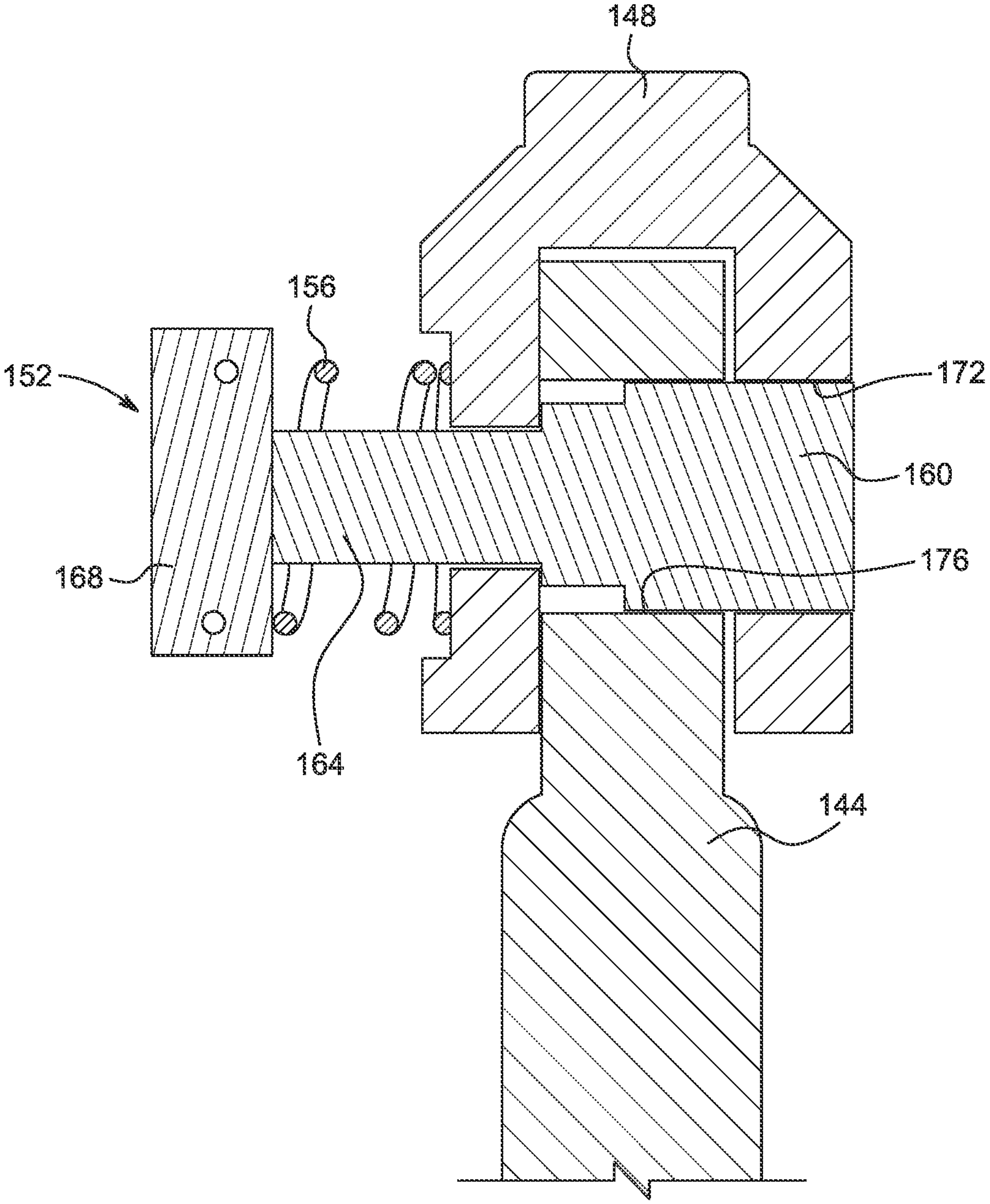
FIG. 14 is a cross-sectional view of the side orientation adjustment mechanism of FIG. 12 taken along section line 14-14.

FIGS. 11-14 illustrate a side handle assembly 20*d* according to another embodiment of the invention. The side handle assembly 20*d* is similar to the side handle of the previous embodiments, with like parts having the same reference numeral plus the letter "d", and the following differences explained below. Rather than using face gears or a ball and socket joint, the orientation adjustment mechanism 72*d* of the illustrated embodiment utilizes a push button assembly 140 including a first receiver 144, a second receiver 148, a shaft 152, and a biasing member 156. The first receiver 144 is affixed to the second end of the rod 32*d* (FIG. 12) and the second receiver 148 is affixed to the mounting assembly (not shown, but like either of the mounting assemblies of FIGS. 4-10). The first and second receivers 144, 148 are shaped to interface is such a way that allows for relative rotation about a common axis of rotation A5. The axis of rotation A5 is defined as the longitudinal axis of the shaft 152. A first end 160 of the shaft 152 in the illustrated embodiment has a non-circular cross-sectional shape (FIG. 12). The shaft 152 also has a middle portion 164 with a circular cross-sectional shape (FIG. 13) and a second end 168 of any shape. In the illustrated embodiment, the first end 160 of the shaft 152 includes a square cross-sectional shape.

The shaft 152 is located within the two receivers 144, 148 such that the first end 160 interfaces with a corresponding hole 172 in the second receiver 148 and a hole 176 in the first receiver 144 that allows the first end 160 of the shaft 152 to have multiple potential engagement orientations. In the illustrated embodiment, the hole 176 of the first receiver 144 is configured as a double-hexagon having twelve points with which the first end 160 of the shaft 152 are engageable. The shaft 152 is axially movable between an engaged position and a disengaged position. The engaged position prevents relative rotation of the first and second receivers 144, 148, while the disengaged position allows the receivers 144, 148 to rotate with respect to each other by disengaging the shaft first end 160 from the hole 176 in the first receiver 144. In the illustrated embodiment, the biasing member 156 is a compression spring. The biasing member 156 is seated between the second end of the shaft 168 and the first receiver 144 to bias the shaft 152 toward the engaged position. In operation, the shaft 152 is biased to the engaged position by the biasing member 156, thereby preventing rotation of the first receiver 144 with respect to the second receiver 148 thus locking the orientation of the handle 28*d* with respect to the hammer drill 4*d*. To alter the orientation of the handle 28*d*, the shaft 152 is pressed to the disengaged position by axially displacing the shaft 152 against the direction of the biasing member 156. In this position, the first end 160 of the shaft 152 is disengaged from the first receiver 144, thereby allowing the receiver 144 to rotate to a new desired position. Once the desired position is reached, the biasing member 156 is again allowed to bias the shaft 152 to the engaged position, preventing further rotation of the first receiver 144.

Although the invention has been described in detail with reference to certain preferred embodiments, variations and modifications exist within the scope and spirit of one or more independent aspects of the invention as described.

Various features of the invention are set forth in the following claims.

What is claimed is:

1. A side handle assembly for a power tool, the side handle assembly comprising:

- a handle configured to be gripped by a user;
- a rod coaxially coupled to a first end of the handle, the rod rotationally fixed to the handle; and
- a clamp coupled to the rod at a second end opposite the first end, the clamp including
  - a flexible band having a first end and a second end, the flexible band enclosing an area,
  - a first connection block coupled to the first end of the flexible band, the first connection block having a through bore, and
  - a second connection block coupled to the second end of the flexible band, the second connection block having a threaded bore;
- wherein the rod includes an annular shoulder abutted with the first connection block and a threaded portion received within the threaded bore of the second connection block,
- wherein, in response to the handle being rotated in a first direction, the second connection block is moved closer to the first connection block along the threaded portion of the rod, decreasing the area enclosed by the flexible band, and
- wherein, in response to the handle being rotated in an opposite, second direction, the second connection block is moved away from the first connection block along the threaded portion of the rod, increasing the area enclosed by the flexible band.

2. The side handle assembly of claim 1, wherein the first connection block is disposed between the handle and the second connection block.

3. The side handle assembly of claim 1, wherein the flexible band is configured to engage a neck of the power tool.

4. The side handle assembly of claim 1, wherein the handle is oriented transverse to a rotational axis of the power tool when the side handle assembly is coupled to the power tool.

5. The side handle assembly of claim 1, wherein the area enclosed by the flexible band is substantially circular.

6. The side handle assembly of claim 1, wherein the rod includes a non-threaded portion disposed axially between the annular shoulder and the threaded portion, the non-threaded portion configured to be received within the through bore of the first connection block.

7. The side handle assembly of claim 1, wherein the annular shoulder is configured to inhibit movement of the first connection block towards the handle.

8. A side handle assembly for a power tool, the side handle assembly comprising:

a handle configured to be gripped by a user;

a rod having a first end fixedly coupled to the handle, the rod and the handle sharing a common longitudinal axis;

a mounting assembly including a first tool interface and a second tool interface, the first tool interface moveable relative to the second tool interface to selectively apply a clamping force to the power tool to secure the side handle assembly to the power tool; and an orientation adjustment mechanism coupling a second end of the rod to the mounting assembly, the orientation adjustment mechanism configured to selectively affix an orientation of the rod and the handle relative to the mounting assembly.

9. The side handle assembly of claim 8, wherein the mounting assembly includes a clamping shaft coupled to the first tool interface and to the second tool interface, and wherein rotation of the clamping shaft moves the first tool interface relative to the second tool interface.

10. The side handle assembly of claim 8, wherein the orientation adjustment mechanism includes a first face gear fixedly coupled to the rod;

a second face gear fixedly coupled to the mounting assembly; and a fastener selectively coupling the first face gear to the second face gear such that when the fastener is tightened, the first face gear is engaged with the second face gear to rotationally fix the first face gear to the second face gear, and when the fastener is loosened, the first face gear is disengaged from the second face gear such that the first face gear is rotatable with respect to the second face gear.

11. The side handle assembly of claim 10, wherein the first face gear is rotatable with respect to the second face gear about an axis oriented transverse to a longitudinal axis of the handle.

12. The side handle assembly of claim 10, wherein the fastener is a bolt and wing nut.

13. The side handle assembly of claim 8, wherein the orientation adjustment mechanism includes a ball and socket joint; and a fastener configured to tighten the ball and socket joint, thereby locking the rod and handle into a fixed orientation, and loosen the ball and socket joint, thereby allowing the orientation of the rod and the handle to be adjusted.

14. The side handle assembly of claim 13, wherein the ball is fixedly coupled to the second end of the rod.

15. The side handle assembly of claim 14, wherein the ball is integrally formed with the rod.

16. The side handle assembly of claim 13, wherein the fastener is a nut threadedly coupled to the socket.

17. The side handle assembly of claim 13, wherein, when the ball and socket joint is tightened, rotation of the handle in a first direction decreases a distance between the first tool interface and the second tool interface, and rotation of the handle in a second direction, opposite the first direction, increases the distance between the first tool interface and the second tool interface.

18. The side handle assembly of claim 8, wherein the orientation adjustment mechanism includes a first receiver fixedly coupled to the second end of the rod, a second receiver fixedly coupled to the mounting assembly, and a push button assembly selectively rotationally affixing the first receiver to the second receiver, the push button assembly including a shaft with a first end having a non-circular cross-sectional shape, a middle portion having a circular cross-sectional shape, and a second end, the shaft movable between an engaged position in which the first receiver is rotationally affixed to the second receiver, and a disengaged position in which the first receiver is rotatable with respect to the second receiver, wherein the shaft is biased toward the engaged position.

19. The side handle assembly of claim 18, wherein the first receiver is configured to engage the first end of the shaft in a plurality of relative rotational positions.

20. The side handle assembly of claim 18, wherein the first receiver is rotatable about a longitudinal axis of the shaft when the shaft is in the disengaged position.

* * * * *